(12) United States Patent
Ranta et al.

(10) Patent No.: US 8,650,345 B2
(45) Date of Patent: Feb. 11, 2014

(54) WEB CONFIGURABLE HUMAN INPUT DEVICES

(75) Inventors: Craig Ranta, Redmond, WA (US); Panos Panay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1618 days.

(21) Appl. No.: 11/589,354

(22) Filed: Oct. 30, 2006

(65) Prior Publication Data

US 2008/0168187 A1 Jul. 10, 2008

(51) Int. Cl.
*G06F 13/12* (2006.01)

(52) U.S. Cl.
USPC ........ 710/73; 710/8; 710/62; 710/63; 341/22; 341/23; 345/168; 345/170; 345/172; 709/203; 709/219; 709/220; 709/221; 717/168; 717/171; 717/172; 717/173

(58) Field of Classification Search
None
See application file for complete search history.

(56) References Cited

U.S. PATENT DOCUMENTS

| 4,823,311 | A | | 4/1989 | Hunter et al. | 708/144 |
|---|---|---|---|---|---|
| 4,853,697 | A | | 8/1989 | Pellizzari et al. | 341/23 |
| 4,853,888 | A | | 8/1989 | Lata et al. | 364/900 |
| 5,063,523 | A | * | 11/1991 | Vrenjak | 709/223 |
| 5,086,503 | A | | 2/1992 | Chung et al. | 395/700 |
| 5,515,045 | A | | 5/1996 | Tak | 341/23 |
| 5,650,799 | A | | 7/1997 | Melen | 345/172 |
| 5,694,562 | A | | 12/1997 | Fisher | 395/349 |
| 5,774,115 | A | | 6/1998 | Jaeger et al. | 345/172 |
| 5,786,811 | A | | 7/1998 | Jaeger | 345/172 |
| 5,831,598 | A | | 11/1998 | Kauffert et al. | 345/168 |
| 5,867,149 | A | | 2/1999 | Jaeger | 345/172 |
| 5,936,554 | A | * | 8/1999 | Stanek | 341/22 |
| 6,012,088 | A | * | 1/2000 | Li et al. | 709/219 |
| 6,359,572 | B1 | | 3/2002 | Vale | 341/23 |
| 6,370,141 | B1 | * | 4/2002 | Giordano et al. | 370/386 |
| 6,798,359 | B1 | | 9/2004 | Ivancic | 341/23 |

(Continued)

FOREIGN PATENT DOCUMENTS

| EP | 1 347 363 A1 | 9/2003 | G06F 3/023 |
|---|---|---|---|
| JP | 2003-514315 | 4/2003 | |
| JP | 2005 284999 | 10/2005 | |
| WO | 2006113827 A1 | 10/2006 | G06F 3/023 |

OTHER PUBLICATIONS

"Creating and Using a Login Script" by Sophos, Jun. 23, 2005.*
"Time-out in user interface: the case of mobile text input" by Marila et al., copyright Springer-Verlag London Limited 2004.*

(Continued)

*Primary Examiner* — Steven Snyder
(74) *Attorney, Agent, or Firm* — Jeremy Snodgrass; Glen Johnson; Micky Minhas

(57) ABSTRACT

A web configurable human input device is provided. The device includes at least one mechanical control element having a dynamically alterable appearance. In some embodiments, the appearance of the at least one mechanical control element is dynamically altered in response to the execution of an input device web script. An example of such a web configurable human input device is an active keyboard in which the at least one mechanical control element having a dynamically alterable appearance is one of an array of keys of the active keyboard. When the active keyboard is connected to a web-enabled device, at least one key of the array of keys is configured to alter its appearance in response to the execution of the input device web script.

12 Claims, 5 Drawing Sheets

(56) References Cited

U.S. PATENT DOCUMENTS

| | | | | |
|---|---|---|---|---|
| 6,816,880 | B1* | 11/2004 | Strandberg et al. | 709/202 |
| 6,834,294 | B1* | 12/2004 | Katz | 709/203 |
| 6,882,859 | B1 | 4/2005 | Rao et al. | 455/550.1 |
| 6,938,079 | B1* | 8/2005 | Anderson et al. | 709/222 |
| 6,973,622 | B1* | 12/2005 | Rappaport et al. | 715/735 |
| 7,007,064 | B2* | 2/2006 | Faris | 709/203 |
| 7,071,845 | B2 | 7/2006 | Ivancic | 341/23 |
| 7,161,587 | B2* | 1/2007 | Beck et al. | 345/168 |
| 7,203,937 | B1* | 4/2007 | Kyle et al. | 717/168 |
| 7,266,594 | B2* | 9/2007 | Kumbalimutt et al. | 709/221 |
| 7,346,808 | B2* | 3/2008 | Srinivasan et al. | 714/27 |
| 2001/0014839 | A1* | 8/2001 | Belanger et al. | 700/245 |
| 2001/0030667 | A1* | 10/2001 | Kelts | 345/854 |
| 2001/0034697 | A1* | 10/2001 | Kaen | 705/37 |
| 2002/0063691 | A1* | 5/2002 | Rogers et al. | 345/168 |
| 2002/0075317 | A1 | 6/2002 | Dardick | 345/808 |
| 2002/0083182 | A1* | 6/2002 | Alvarado et al. | 709/231 |
| 2002/0169776 | A1* | 11/2002 | Tuunanen et al. | 707/9 |
| 2002/0188721 | A1 | 12/2002 | Lemel et al. | 709/225 |
| 2003/0001720 | A1* | 1/2003 | Wade et al. | 340/3.5 |
| 2003/0006965 | A1* | 1/2003 | Bohn | 345/163 |
| 2003/0069921 | A1* | 4/2003 | Lamming et al. | 709/203 |
| 2003/0101247 | A1* | 5/2003 | Kumbalimutt et al. | 709/221 |
| 2003/0201982 | A1 | 10/2003 | Iesaka | 345/168 |
| 2003/0208472 | A1 | 11/2003 | Pham | 707/2 |
| 2003/0224843 | A1 | 12/2003 | Wang | 463/1 |
| 2003/0233482 | A1* | 12/2003 | Skrepetos | 709/250 |
| 2004/0036632 | A1 | 2/2004 | Ford | 341/22 |
| 2004/0093446 | A1 | 5/2004 | Lin | 710/67 |
| 2004/0217939 | A1 | 11/2004 | Levy et al. | 345/156 |
| 2005/0039197 | A1* | 2/2005 | Ahmad et al. | 719/331 |
| 2005/0219220 | A1 | 10/2005 | Kishi et al. | 345/169 |
| 2005/0278569 | A1* | 12/2005 | Srinivasan et al. | 714/25 |
| 2006/0015195 | A1* | 1/2006 | Lehman et al. | 700/83 |
| 2006/0022951 | A1* | 2/2006 | Hull | 345/170 |
| 2006/0049965 | A1* | 3/2006 | Laliberte et al. | 341/24 |
| 2006/0168376 | A1 | 7/2006 | Ilyasov | 710/67 |
| 2006/0187142 | A1* | 8/2006 | Lesniak | 345/1.1 |
| 2006/0227097 | A1* | 10/2006 | Zhou et al. | 345/107 |
| 2006/0262083 | A1* | 11/2006 | Zhou et al. | 345/107 |
| 2007/0065215 | A1* | 3/2007 | Brown | 400/490 |
| 2009/0033522 | A1* | 2/2009 | Skillman et al. | 341/23 |
| 2009/0164564 | A1* | 6/2009 | Willis | 709/203 |
| 2010/0035665 | A1* | 2/2010 | Munson | 455/575.1 |

OTHER PUBLICATIONS

'Future Look: The Optimus Organic LED Keyboard—The Optimus OLED Keyboard Will Change Keyboards Forever' by Nathan Kirsch, Sep. 19, 2005, for legitreviews.com.*
'Optimus Keyboard by Art.Lebedev' by Mike Hanlon, Jun. 15, 2005 for gizmag.com.*
'Client-side Scripting' article on Wikipedia, posted on Oct. 8, 2005.*
'Universal Serial Bus Specification' Revision 2.0, Apr. 27, 2000, pp. i, ii, 24, 253, 254, 260-263. (Full document can be found at http://www.usb.org/developers/docs/).*
Wikipedia Article "HTML" from Oct. 24, 2006.*
'Ebay University Tutorial—Getting Started' from Jan. 17, 2005.*
'Toward a Common Component Architecture for High-Performance Scientific Computing' by Armstrong et al., copyright 1999, IEEE.*
'Component Technologies: Java Beans, COM, CORBA, RMI, EJB and the CORBA Component Model' by Emmerich et al., copyright 2002, ACM.*
'Analysis of a Conflict Between Aggregation and Interface Negotiation in Microsoft's Component Object Model' by Sullivan et al., IEEE Transactions on Software Engineering, vol. 25, No. 4, Jul./Aug. 1999.*
'KB607SL—Silver Illuminated Office Pro Keyboard USB/PS2' at Logisys' product webpage from Sep. 2, 2006.*
International Search Report and Written Opinion from counterpart foreign Application No. PCT/US2007/081913 filed on Oct. 19, 2007.
S. Hudson; "Using Light Emitting Diode Arrays as Touch-Sensitive Input and Output Devices," ACM Press, vol. 6, Issue 2, http://portal.acm.org/citation.cfm?id=1029632.1029681, 2004, pp. 287-290.
S. Liberman, "Test Documentation for Keyboard Navigation," http://www.mozilla.org/quality/brower/front-end/testcases/keyboard-nav/, 1998-2006, pp. 1-7.
J. Saczuk, "Desktop Mapping and GIS System—Digimap-GeoSET," http://www.sggw.waw.pl/~saczuk/publik/jcs16.pdf, articled published prior to Aug. 11, 2006, pp. 1-3.
"European Search Report", Mailed Date: Apr. 27, 2011, Application No. EP/07863434, Filed Date: Apr. 27, 2011, pp. 6.
Communication dated May 16, 2011 for European Application Serial No. 07863434.2-2224/2087414 (PCT/US2007081913). 1 pg.
Notice of Rejection for corresponding Japanese application 2009-534782, dated Dec. 6, 2011.
Japanese Patent Application No. 2009-534782 Final Rejection dated Dec. 7, 2012. 6 pages.

* cited by examiner

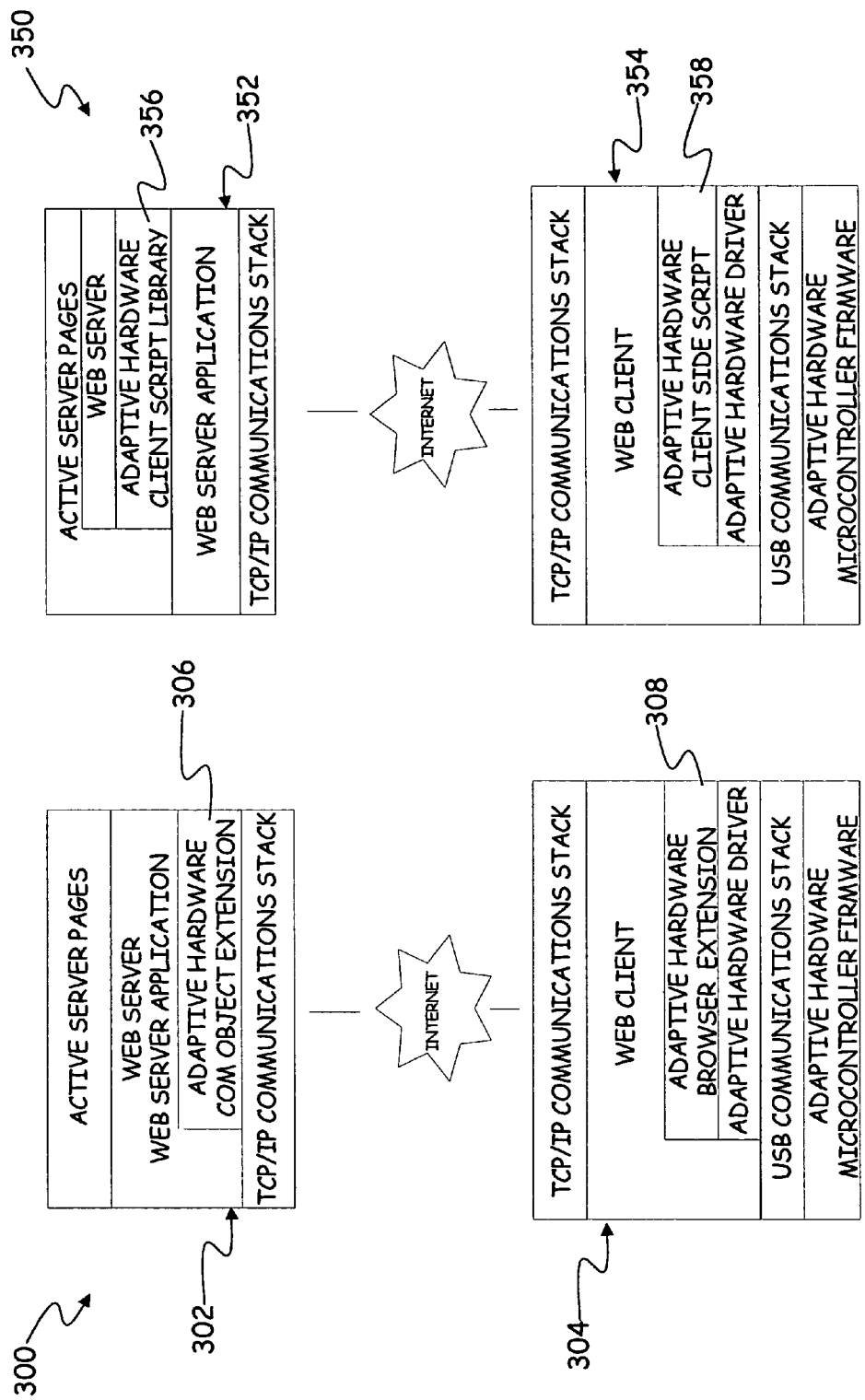

WEB CONFIGURABLE HUMAN INPUT DEVICES

BACKGROUND

The prevalence of the Internet has resulted in the availability to the general public of billions of unique information pages. Along with this has come a steadily increasing complexity in web browser interfaces, web page content, and an increasing amount of information displayed to a user as screens grow larger and resolutions higher.

The growth in web page interface complexity, coupled with the absence of a "standard" layout for web pages, makes navigating the Web an exercise in trial and error, especially for a child or novice user. Every object, picture, or text item on a screen can potentially be "clickable;" and although relatively sound interface design would lead to giving a user cues such as underlined text, this rule is not universally adhered to.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A web configurable human input device is provided. The device includes at least one mechanical control element having a dynamically alterable appearance. In some embodiments, the appearance of the at least one mechanical control element is dynamically altered in response to the execution of an input device web script. An example of such a web configurable human input device is an active keyboard in which the at least one mechanical control element having a dynamically alterable appearance is one of an array of keys of the active keyboard. When the active keyboard is connected to a web-enabled device, at least one key of the array of keys is configured to alter its appearance in response to the execution of the input device web script. Employing such an active keyboard allows web page authors to control the appearance (and sometimes the content) of the keyboard function keys, for example, to display a dynamic menu of possible actions.

In general, web applications can communicate with web configurable human input devices, in accordance with the present embodiments, to thereby make their web sites easier to navigate and use, especially for novice users.

BRIEF DESCRIPTION OF THE DRAWINGS

FIGS. 3A and 3B are simplified block diagrams that illustrate different method embodiments.

DETAILED DESCRIPTION

Disclosed is a web configurable human input device. As noted earlier, the device includes at least one mechanical control element having a dynamically alterable appearance. The appearance of the at least one mechanical control element is dynamically altered in response to the execution of an input device web script. An active keyboard, which is an example of such a web configurable human input device, is first described below. Thereafter, other example web configurable human input devices are described. Finally, a description of an example computing environment in which such devices can be employed is provided.

Figure 1:
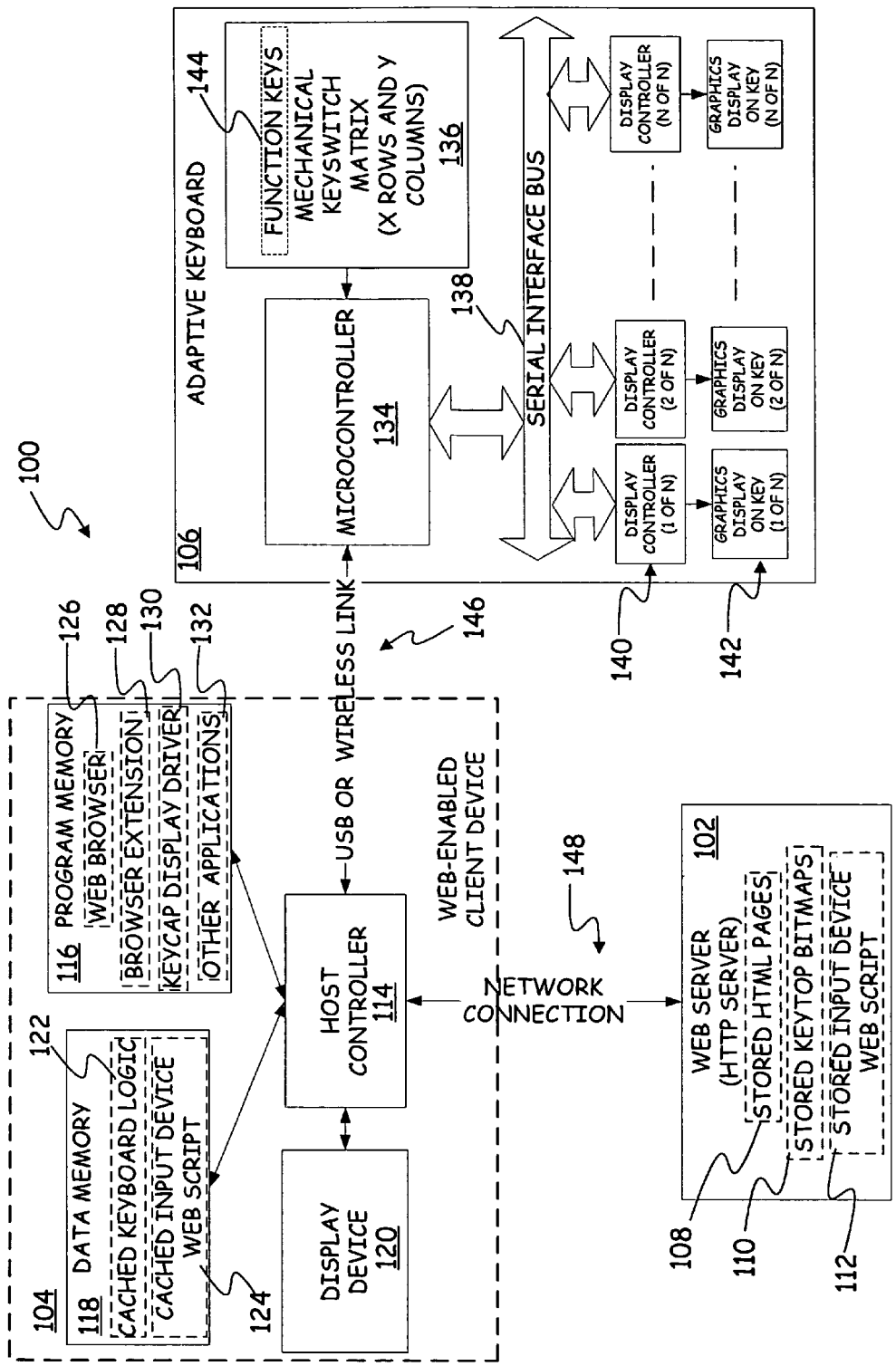
FIG. 1 is simplified block diagram of a computing system that includes a web configurable human input device in accordance one of the present embodiments.

FIG. 1 is simplified block diagram of a computing system 100 that includes a web configurable human input device in accordance one of the present embodiments. As can be seen in FIG. 1, computing system 100 includes a web server 102, a web-enabled client device 104 and an active keyboard 106, which, as noted above, is one example of a web configurable human input device.

In the example embodiment shown in FIG. 1, web server 102 is a hypertext transfer protocol (HTTP) server which includes hypertext markup language (HTML) code designed to render web pages on a display device of a client when downloaded and interpreted by the client web browser, in a manner that standard web servers and browsers currently operate. However, in accordance with the present embodiments, web server 102 also includes custom HTML code extensions designed to render display images on keycaps of adaptive keyboard 106 when downloaded and interpreted by special extensions of the client web browser. Additionally, server 102 includes stored bitmaps of keytop images (denoted by reference numeral 110), which are requested by the client web browser when needed, and logic in the form of a downloadable script (input device web script) 112, which can control what actions are taken and what is to be displayed on the adaptive keyboard keytops when any event takes place.

In connection with the present embodiments, two different example techniques for utilizing the input device web script 112 to control information on adaptive keyboard 106 are provided. In a first technique, input device web script 112 is executed on web server 102. More specifically, in this technique, when a particular key on active keyboard 106 is pressed by a user, for example, the key is sent to web server 102 and server 102 contains and executes input device web script 112, which determines how to respond to the particular input. Here, input device web script 112 on web server 102 can communicate with a browser extension, on web-enabled client device 104, that understands a special adaptive keyboard command protocol. In a second technique, input device web script 112 is downloaded from web server 102 to web-enabled client device 104 and executes locally on client 104. In this technique, while dormant, input device web script 112 can continuously poll devices, such as active keyboard 106, to determine if a particular key is pressed, for example, and provide a suitable response when the particular input is detected. As in the case of the first technique, the second technique also requires a suitable web browser extension to support the additional functionality that it provides. Details regarding certain software aspects of the above two example techniques are provided further below in connection with FIGS. 3A and 3B.

Referring again to FIG. 1, in general, web-enabled client device 104 includes a host controller 114, a program memory 116, a data memory 118 and a display device 120. Program memory 116, data memory 118 and display device 120 operate under the control of host controller 114. The program memory 116 includes a suitable program such as a web browser for interpreting HTTP or other remote commands from the server 102. Host controller 114 can communicate with adaptive keyboard 106 and server 102 using any suitable type of wired (universal serial bus (USB), for example) or wireless link. In FIG. 1, the communication link between host controller 114 and adaptive keyboard 106 is denoted by reference numeral 146 and the network connection between host controller 114 and web server 102 is denoted by reference numeral 148.

Program memory 116, of web-enabled client device 104, includes, as mentioned above, a web browser 126 and program code (including keycap display driver 130) to communicate to web server 102 and adaptive keyboard 106. Also included in program memory 116 is a web browser extension 128 that is configured to support the extended functionality that the present embodiments provide. One such additional function included in web browser extension 128 can be the ability to query and report to web server 104 whether a web configurable human input device is present and, if present, also report the type of web configurable human input device. It should be noted that this function is an addition to reporting functions included in current web browsers. Of course, other applications (denoted by reference numeral 132), which are unrelated to the present embodiments, can also be stored in program memory 116.

Data memory 118 can store input device web script 122 and keytop bitmaps 124, which can be sent to adaptive keyboard 106 when commanded by web browser 126 (in some embodiments) or keyboard logic (in other embodiments). It should be noted that input device web scripts are given different numbers on web server 102 and web-enabled client device 104 because they are different copies. In web-enabled client device 104, display device 120 renders HTML code and executes logic scripts downloaded from web server 102.

As can be seen in FIG. 1, adaptive keyboard 106 includes a microcontroller 134, a mechanical keyswitch matrix (or array of keys) 136 with x rows and y columns, well known to those skilled in the art, a serial interface bus 138, a plurality (N) of individual display controllers 140 and a plurality (N) of graphics displays 142. Microcontroller 134 communicates with web-enabled client device 104 and serial interface bus 138, and reads a status of mechanical keyswitch matrix 136. Serial interface bus 138 connects the N individual display controllers 140, each inside an individual key, which contains display random access memory (RAM), a timing generator, and row and column drivers. The N graphics displays 142 display information contained in their respective display controller RAM.

As indicated above, in the present embodiments, a web page on web server 102 initially contains input device web script 112 that determines both what to display on keys and what action is taken when a key is pressed (or any other input command is received, such as mouse or speech input). For example, if function keys 144 are all programmable, input device web script 112 can change all the function keytops to alternate displays when a "shift" key is pressed. Similarly, input device web script could change the keytops when a timer expires, or when data from another network source changes; for example a key flashes a red icon to indicate someone is requesting an Internet voice call or instant messaging session. An HTML web page may contain special embedded objects, that when downloaded to client browser 126, cause it to send a command to adaptive keyboard 106 to change a display on a particular keytop. If client browser 126 does not understand this special object, no action is taken. Also, as mentioned above, a web browser extension may include the ability to query and report to web server 104 whether a web configurable human input device is present and, if present, also report the type of web configurable human input device.

In the above programmable function key example, in addition to utilizing graphics displays on top of each function key, the keys can also be illuminated in two or more colors such as red, yellow, and green. Further, the keys can be made to flash color or display animations. In general, such embodiments allow web page authors to control the content and appearance of the keyboard function keys to display a dynamic menu of possible actions. For example, a mapping site might define one key to print a map with a green printer icon, two more keys to zoom in and out with large and small magnifying glass icons, and another letter icon to email a map to a friend.

Another example is an online auction site using the active keyboard interface to help their customers keep track of participation in online auctions. The online auction site could deploy an application which assigns each auction being watched a key on the active keyboard. Each key has an icon or text identifying the type of auction, and is green, or red, signifying whether or not the user has been outbid. Simply pressing the key when it turns red could enter a new bid.

In the above examples, web applications communicate with configurable keyboards to make their web sites easier to navigate and use, especially for novice users. The above embodiments also provide a consistent technique for presenting options to a user without utilizing valuable screen real estate.

Figure 2A:
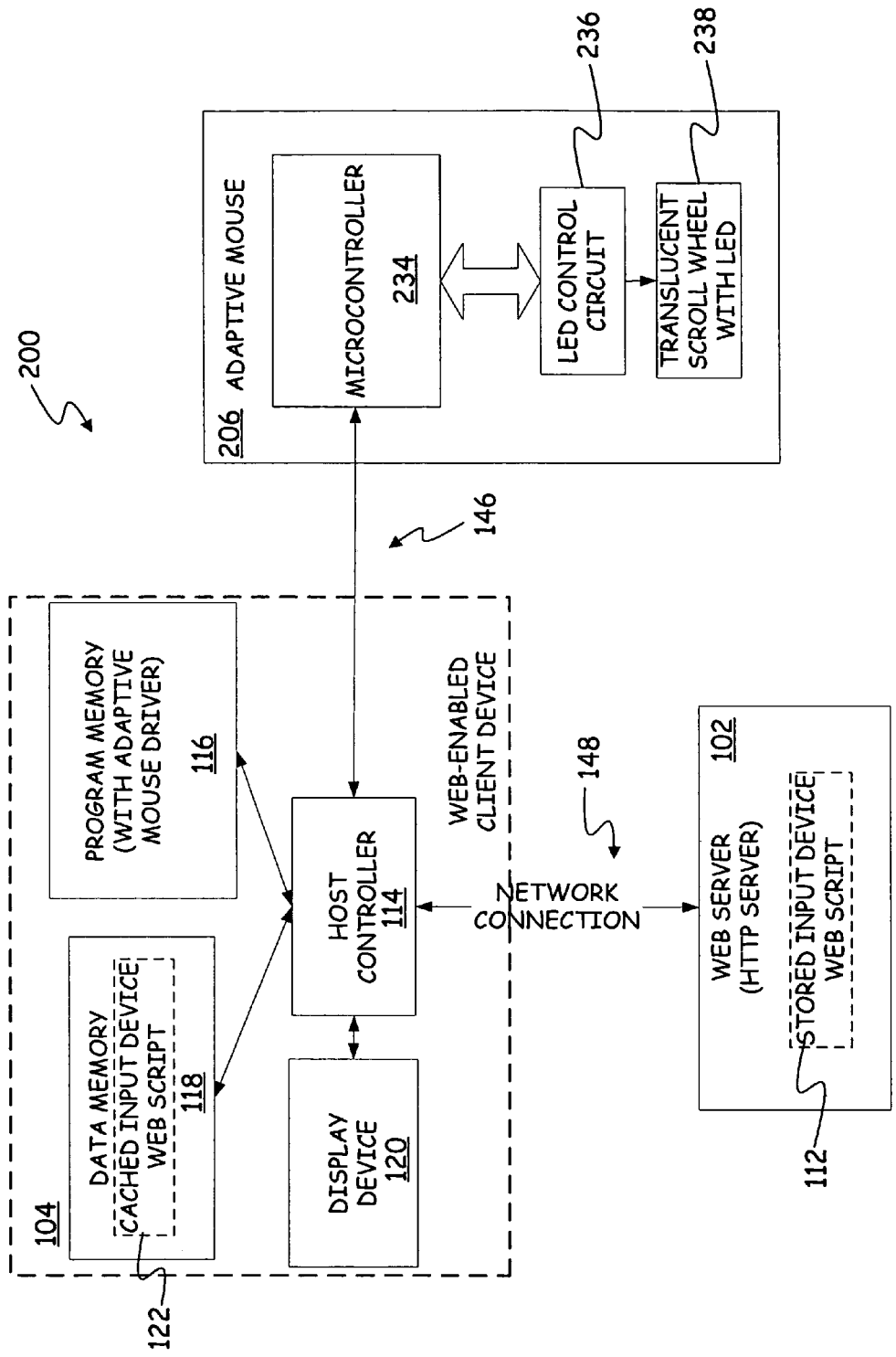
FIGS. 2A and 2B are simplified block diagrams of other example embodiments of web configurable human input devices.

FIG. 2A is a simplified block diagram of a computing system 200 that includes an adaptive mouse 206, which is another example of a web configurable human input device. In FIG. 2A, components of system 200 that are similar to components of system 100 (FIG. 1) are denoted by the same reference numerals. Also, descriptions of these similar components are not repeated. A typical mouse is equipped with a scroll wheel, which can be used to scroll an information window vertically. With a standard mouse, user input to the scroll wheel will typically not result in any response unless the active information window has either horizontal or vertical scroll bars displayed. However, in the embodiment of FIG. 2A, a scroll wheel 238, which is translucent and can be illuminated by a colored light-emitting diode (LED), is included. Illumination of scroll wheel 238 is controlled with the help of microcontroller 234, which communicates with web-enabled client device 104, and LED control circuit 236. In an example embodiment, when a web page displays a window or list box with vertical scroll bars, input device web script 112 or a local application can illuminate scroll wheel 238, indicating to a user that its function is active. This adaptive behavior of input devices makes web browsing and computer software easier to learn and use.

Figure 2B:
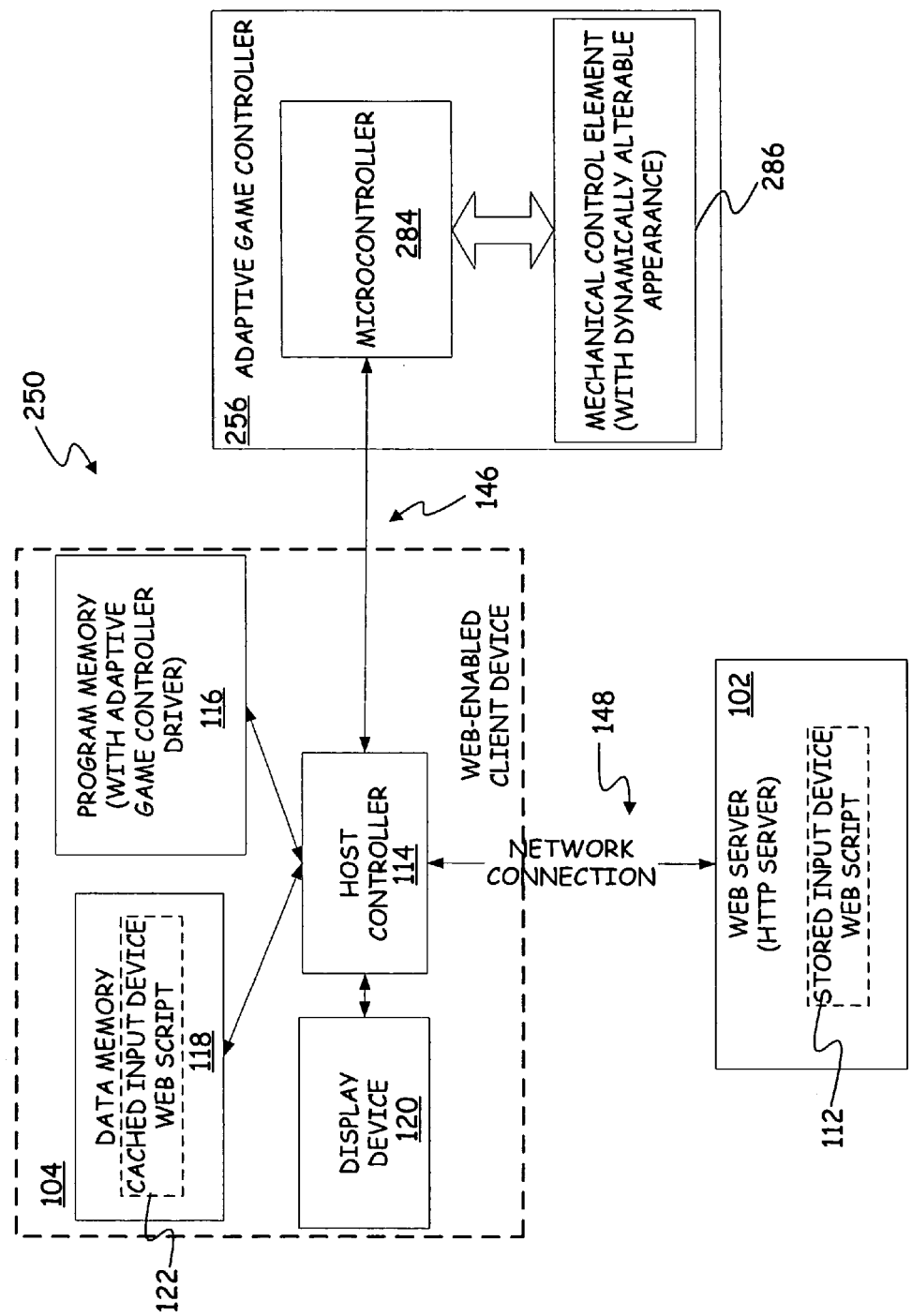

FIG. 2B is a simplified block diagram of a computing system 250 that includes an adaptive game controller 256, which is yet another example of a web configurable human input device. In FIG. 2B, components of system 250 that are similar to components of systems 100 (FIG. 1) and 200 (FIG. 2A) are denoted by the same reference numerals. In the very simplified block diagram of FIG. 2B, example adaptive game controller 256 is shown as including a microcontroller 284 and a single mechanical control element (or game control element) 286, which has a dynamically alterable appearance. As in the case of the earlier described embodiments, game control element 286 is configured to change its appearance in response to execution of input device web script 112 on web server 102 or in response to execution of downloaded input device web script 122 locally on web-enabled client device 104. In one particular embodiment in an online game, input device web script 112, 122, may be executed upon the occurrence of a predetermined event on web-enabled client device 104. In one example, switching weapons in a first person shooter game highlights the controls that are active for that particular weapon. In this manner, the various input mode changes that occur frequently in video games can be communicated to the user by illuminating or highlighting the active controls.

It should be not that although each of the above examples of web configurable human input devices have been shown as belonging to a different computing system, all the above example web configurable human input devices can be included in a single computing system. Other examples of web configurable human input devices include adaptive trackballs, touch pads, joysticks, game pads, etc.

In accordance with another one of the present embodiments, a plurality of standard and custom key assignments and keytop legends can be made available for both local and Web applications, and this information can be stored in a user profile on the Web. Here, an adaptive keyboard is customized for a user's context, no matter where the user is located or what computer is being used. A suitable browser extension allows a server or local script to query a user's personal computer (PC) for the presence and type of configurable web device. If such a device is present, it can be utilized to the extent of its capabilities. If not, the web site can alternatively provide clickable controls on the client's visual rendering of the web page or a virtual representation of the active device controls as they would appear.

FIGS. 3A and 3B illustrate software component sets 300 and 350 employed for implementing the two different example techniques, discussed earlier, for utilizing an input device web script to control information on a web configurable human input device. As noted earlier, in the first technique, an input device web script executes on a web server, and in the second technique, the input device web script is downloaded from the web server and executes on the web-enabled client device. FIGS. 3A and 3B show software components for implementing the first and second techniques, respectively. In FIGS. 3A and 3B, similar components on a web server side (302 in FIGS. 3A and 352 in FIG. 3B) include active server pages, web server applications and transmission control protocol/Internet protocol (TCP/IP) communication stacks. Similar components in both embodiments on a client side (304 in FIGS. 3A and 354 in FIG. 3B) include TCP/IP communication stacks, adaptive hardware drivers and communication stacks for communicating with hardware and firmware of a web configurable human input device.

In the example embodiment shown in FIG. 3A, the input device web script is the form of an adaptive hardware component object model (COM) object extension 306 on server side 302 that communicates with the web configurable human input device via adaptive hardware browser extension 308 on client side 308. In contrast, the example embodiment shown in FIG. 3B includes an adaptive hardware client script library 356 on server side 352 from which a copy of adaptive hardware client side script 358 is downloaded to the client side and executes locally on the client machine. This allows for faster response times for Internet games, for example, and faster switching between a fixed set of displayed functions.

Any person skilled in the art would recognize that there are other communications models possible and certainly more will evolve as Internet software technology evolves.

Figure 4:
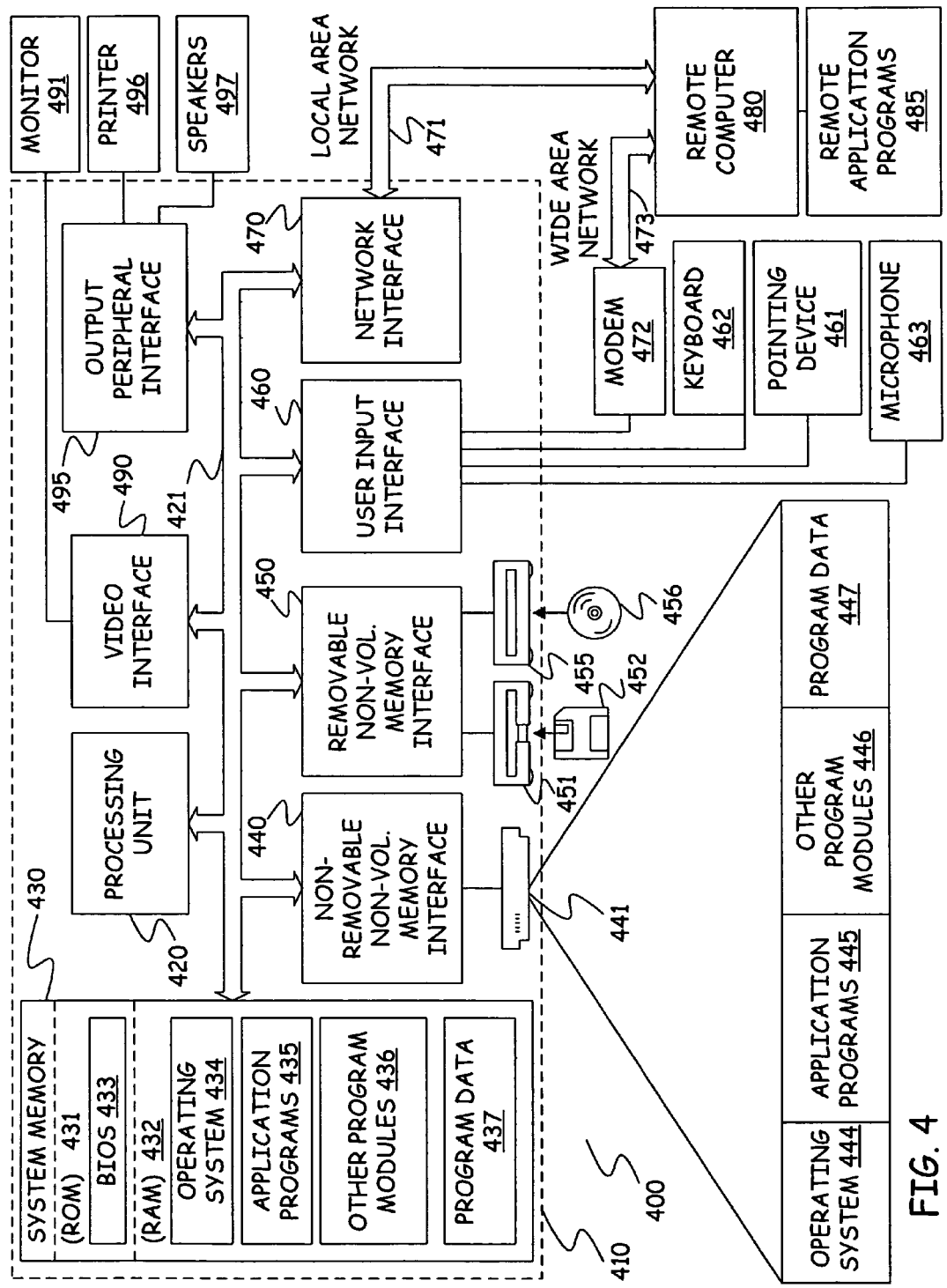
FIG. 4 is a block diagram of one illustrative operating environment in which web configurable human input devices in accordance with the present embodiments can be used.

FIG. 4 illustrates an example of a suitable computing system environment 400 on which embodiments may be implemented. One exemplary place for web configurable human input devices (such as 106, 206 and 256) to fit into environment 400 is in user input interface 460, which is described in general below. Suitable drivers, browser extensions and input device web scripts for the operation of web configurable human input devices (such as 106, 206 and 256) can be included in one or more memories shown in FIG. 4. Also, the computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400. Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, televisions, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. Still other input devices (not shown) can include non-human sensors for temperature, pressure, humidity, vibration, rotation, etc. These and other input devices are often connected to the processing unit 420 through a user input interface 460 that is coupled to the system bus, but may be connected by other interface and bus structures, such as a parallel port, game port or a USB. It should be noted that the input devices may be web configurable human input devices in accordance with the present embodiments. A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

It should be understood that the phrase "browser extension," which has been used above in connection with a browser add-on to support the extended functionality that the present embodiments provide, is used in a generic sense and can be equally applied to an "Active X control," or "Browser Helper Object," for example, each of which can be utilized in conjunction with certain browsers. Downloading and installing an Active X control from a web site, for example, makes a library of extended functions permanently available to the client for control of active input devices (web configurable human input devices, for example). In contrast with the permanent availability of an installed Active X control, a Browser Helper Object is usually loaded once for each copy of the browser that is running.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A web configurable human input device comprising:
a plurality of user input elements;
a plurality of dynamically alterable displays that are associated with the user input elements;

a micro controller that receives images, a script, and a user profile from a web server, wherein the user profile includes custom key assignments for both local applications and web-based applications, the micro controller assigning the images to the displays based at least in part on the user profile and the script, and the micro controller utilizing the script to execute a specified action in response to an actuation of one of the user input elements; and a web browser extension that is received by the human input device through a web page, the web browser extension being configured to determine a status of the human input device and to report the status to the web page, wherein the status of the human input device includes an indication of whether or not a time has expired.

2. The device of claim 1, wherein at least one of the dynamically alterable displays is a component of a scroll wheel.

3. The device of claim 1, wherein the micro controller utilizes the script to continuously poll the user input elements to detect the actuation of the one of the user input elements, wherein the user profile is stored remotely and is configured to be accessed by multiple computing devices, and wherein the specified action includes displaying an animation.

4. The device of claim 1, and further comprising:
a timing generator that alters the displays based on an expiration of a time;
wherein the script includes custom HTML code extensions; and
wherein the specified action includes illuminating an active control.

5. The system of claim 1, wherein the dynamically alterable displays are components of a game controller, wherein the script illuminates a portion of the dynamically alterable displays based on which ones of the plurality of user input elements are active within a video game, and wherein the script is implemented utilizing an adaptive hardware component object model.

6. A method comprising:
receiving at a web-enabled client device a web script and a user profile from a web server, wherein the user profile is specific to a user of a user input device and includes information indicative of key assignments on the user input device for customizing the user input device for the user's context;

receiving from the web server a query requesting information pertaining to presence of the user input device and a type of the user input device;
receiving at the web-enabled client device an input from the user input device;
utilizing the web-enabled client device to generate an image request based at least in part on the web script, the user profile, and the input;
transmitting the image request from the web-enabled client device to the web server;
receiving images at the web-enabled client device from the web server;
utilizing the user profile and a controller of the web-enabled client device to determine key assignments on the user input device for the images; and
transmitting the images from the web-enabled client device to the user input device based at least in part on the determined key assignments.

7. The method of claim 6, wherein receiving the input from the user input device comprises polling the user input device to detect the input, wherein the web server is associated with a mapping site, and wherein the key assignments include associating keys with a zoom in function, a zoom out function, a printing function, and an email function.

8. The method of claim 6, and further comprising:
querying the user input device to determine its type;
reporting the user input device type to the web server;
wherein the web server is associated with an online auction site; and
wherein the key assignments include associating keys with an auction, a status of a bid, and a bidding function.

9. The method of claim 6, wherein the web server is associated with an online game, wherein the key assignments include highlighting active keys, and wherein the input from the user input device is associated with changing a weapon within the online game.

10. The method of claim 6, wherein the user input device is customized for the user's context independent of the client device and of a location of the user.

11. The method of claim 6, wherein the web script received at the web-enabled client device is based at least in part on a response to the query.

12. The device of claim 2, wherein the component of the scroll wheel is configured to illuminate the scroll wheel.

* * * * *